United States Patent
Broberg et al.

(10) Patent No.: US 8,903,944 B2
(45) Date of Patent: Dec. 2, 2014

(54) VERSION SELECTIVE CONTENT DELIVERY

(75) Inventors: David K. Broberg, Lafayette, CO (US); J. Clarke Stevens, Littleton, CO (US); Judson D. Cary, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 572 days.

(21) Appl. No.: 13/228,824

(22) Filed: Sep. 9, 2011

(65) Prior Publication Data

US 2013/0067021 A1    Mar. 14, 2013

(51) Int. Cl.

| | |
|---|---|
| G06F 15/16 | (2006.01) |
| H04N 21/2343 | (2011.01) |
| H04N 21/84 | (2011.01) |
| H04L 29/06 | (2006.01) |
| H04N 21/239 | (2011.01) |
| H04N 21/472 | (2011.01) |
| H04N 21/658 | (2011.01) |
| H04L 29/08 | (2006.01) |
| H04N 21/2662 | (2011.01) |

(52) U.S. Cl.
CPC ... *H04N 21/47202* (2013.01); *H04N 21/23439* (2013.01); *H04N 21/8402* (2013.01); *H04L 65/4084* (2013.01); *H04N 21/2393* (2013.01); *H04N 21/6581* (2013.01); *H04L 67/303* (2013.01); *H04L 65/80* (2013.01); *H04N 21/2662* (2013.01)
USPC ............... 709/217; 709/248; 725/82; 725/87; 725/98

(58) Field of Classification Search
USPC .......................... 709/217, 248; 725/82, 87, 98
See application file for complete search history.

(56) References Cited

U.S. PATENT DOCUMENTS

| | | | |
|---|---|---|---|
| 2005/0097595 A1* | 5/2005 | Lipsanen et al. ................ 725/25 |
| 2008/0141317 A1* | 6/2008 | Radloff et al. ................. 725/87 |
| 2008/0201748 A1* | 8/2008 | Hasek et al. .................... 725/98 |
| 2010/0100449 A1 | 4/2010 | Broberg et al. |
| 2011/0185392 A1* | 7/2011 | Walker ........................... 725/82 |
| 2012/0303738 A1* | 11/2012 | Gilson ......................... 709/217 |

OTHER PUBLICATIONS

"API Overview", EIDR System Version 1.0, EIDR—Entertainment Identifier Registry, Apr. 11, 2011, 47 pages.
"Data Fields Reference", EIDR System Version 1.0, EIDR—Entertainment Identifier Registry, May 9, 2011, 46 pages.
"Rest API Reference", EIDR System Version 1.0, EIDR—Entertainment Identifier Registry, Apr. 25, 2011, 22 pages.
"Universal Unique Identifiers in Movie and Television Supply Chain Management", EIDR—Entertainment Identifier Registry, Oct. 2010, 10 pages.
http://87.84.226.196/grid/grid_syntax.html, "GRid Standard: GRid Syntax", Jul. 11, 2011, 4 pages.

* cited by examiner

*Primary Examiner* — Hee Soo Kim
*Assistant Examiner* — Kidest Mendaye
(74) *Attorney, Agent, or Firm* — Great Lakes Intellectual Property, PLLC

(57) ABSTRACT

A method and system of ID based content delivery where the selection and transmission of content is facilitated with use of version IDs associated with each available version of each particular piece of content. A relationship may be generated between the available versions in the version IDs to facilitate determining the version ID associated with a version desired for rendering at a particular type of terminal.

17 Claims, 2 Drawing Sheets

VERSION SELECTIVE CONTENT DELIVERY

TECHNICAL FIELD

The present invention relates to facilitating content delivery when the same piece of content is available for delivery according to two or more versions.

BACKGROUND

Electronic content, such as pictures, music, video and audio-video works, may be transmitted to a terminal for rendering. Multiple versions of the content may be created to facilitate specific types of rendering and renderings through specific types of terminals or mediums. The versions may provide dissimilar renderings in that some may include: operating specific renderings, e.g., operation systems, protocols, etc.; definitional specific renderings, e.g., HD or SD renderings; dimensional specific renderings, e.g., 2D or 3D rendering; language specific renderings, e.g., English, French, etc.; transport specific renderings, e.g., MPEG-2, fragmented file format (MPEG-DASH), Smooth-Streaming, Live-Streaming, etc.; and codec specific renderings, e.g., MPEG-1, MPEG-2, MPEG-4-AVC, MVC, VC-1, AC-3, E-AC-3, AAC, HE-AAC, etc. A source configured to facilitate transport of the various versions of the content faces a difficult challenging in tracking the operating capabilities and needs of the rendering terminal, or user preferences. One non-limiting aspect of the present invention contemplates ameliorating this problem in an efficient manner.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
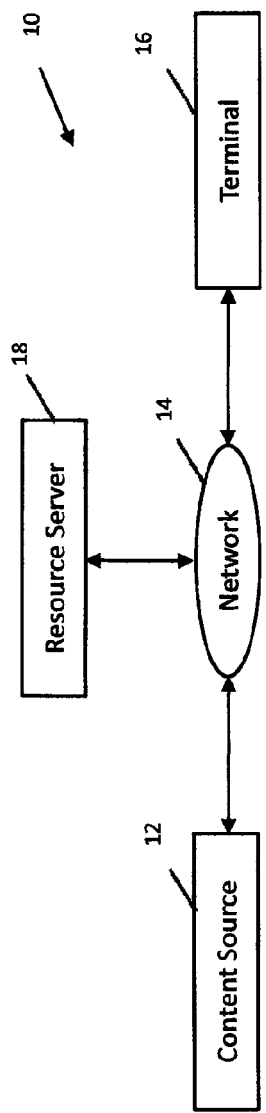
FIG. 1 illustrates a system for delivering content in accordance with one non-limiting aspect of the present invention.

FIG. 1 illustrates a system 10 for delivering content in accordance with one non-limiting aspect of the present invention. The system 10 is predominately described with respect to a content source 12 being operable to facilitate content transmission over a network 14 to a terminal 16 for rendering. The content may be any type of electronic content suitable for electronic transmission over the network 14, such as but not limited to video, audio, or some combination thereof. The content is described with respect to being sourced at some point after the various versions of the content are identified and formatted for transmission to the terminal 16. This is done for exemplary non-limiting purposes as the present invention fully contemplates facilitating transmission of available version of the content prior to or in real-time with the generation of the content. For example, content may be formatted and identified, and then transmitted "on the fly" or upon request from the terminal or user.

The content source 12 may be any type of entity sufficiently operable to facilitate transmission of electronic content to the terminal 16. The content source 12 may be, for example, a cable television service provider, a broadcast television service provider, a satellite television service provider, a multiple system operator (MSO), a streaming video/audio server/service, a home media gateway, or any other entity operable to facilitate transmission of selectable versions of available content. While the content source is shown to communicate with the terminal 16 over network 14, the network 14 may be a local network or the content source 12 may be part of the terminal 16, e.g., the content source 12 may be a personal video recorder (PVR) or home media gateway included as part of the terminal 16 or part of a home network of the terminal 16. One non-limiting aspect of the present invention contemplates the content source 12 being a television type of service provider operable to facilitate transmission of various versions of a television program/movie to the terminal for rendering. Content source 12 may actually be multiple content sources, such as Internet, cable, DVR, broadcast, etc.

The content source 12 may be operable to transmit the content according to one or more of a plurality of versions. The versions of the content (television program) available for transmission to the terminal 16 for rendering may include: operating specific renderings, e.g., operation systems, protocols, etc.; definitional specific renderings, e.g., HD or SD renderings; dimensional specific renderings, e.g., 2D or 3D rendering; language specific renderings, e.g., English, French, etc.; transport specific renderings, e.g., MPEG-2, fragmented file format (MPEG-DASH), Smooth-Streaming, Live-Streaming, etc and codec specific renderings, e.g., MPEG-1, MPEG-2, MPEG-4-AVC, MVC, VC-1, AC-3, E-AC-3, AAC, HE-AAC, etc. Of course, the present invention is not necessarily intended to be limited to these enumerated versions and fully contemplates the content being available according to any number of other versions, in particular to versions specifically formatted or otherwise specifically prepared for transmission to a particular type of terminal 16 or user preference.

The terminal 16 may be any type of terminal sufficient for rendering electronic content. The terminal 16 may be, for example, a set-top box (STB), a television, a computer (desktop, laptop, tablet, PDA, etc.), a mobile phone, a media terminal adapter (MTA), a digital video recorder (DVR), etc. The terminal 16 may include a display or other output through which with the content may be rendered. The terminal may include a user interface or other feature to facilitate interacting with a user thereof, such as to facilitate selection of the content and/or versions of the content as contemplated by the present invention. The terminal 16 may include a memory, a processor, and other elements necessary to facilitate communications and other operations associated with the present invention.

The network 14 may be any type of electronic medium through which signals may be exchanged between one or more of the content source 12, resource server 18, and/or the terminal 16. The network 14 may be any type of wireline or wireless network, or combination thereof, such as but not limited to a cable television network, a cellular network, a Wi-Fi network, an optical network, etc. The network 14 may be operable to support multiple types of signal transmissions, such as in-band and out-of-band transmissions. The in-band signaling may be associated with a type signaling, such as that used to transmit television signaling to a STB, where data is transmitted within MPEG or other video transmission packets, i.e., with the content transmission. The out-of-band signaling may be associated with a type of signaling, such as that used to facilitate packet-based communications over non-proprietary networks, e.g. IP-based communications carried out over the Internet. Such signaling, or any combination thereof, may be used by the content source 12 to communicate with the terminal 16 and may also be used by the resource server 18 to communicate with the terminal 16.

The resource server 18 may be included in accordance with the present invention to facilitate delivery of a unique content ID associated with content located at the content source 12 for rendering at the terminal 16. The resource server 18 is shown to be separate from the content source 12 for exemplary non-limiting purposes. The present invention fully contemplates the content source 12 and/or the resource server 18 being part of or otherwise associated with the same entity. The resource server is shown to be separate in order to demonstrate one aspect of the present invention where the resource server is an independent entity capable of identifying specific versions of the content with a universal, unique, ID. The resource server 18 may be operable with studios and other originators of the content to facilitate registering the content and identifying versions of the content to which IDs may be associated, such as in cooperation with Entertainment ID Registry (EIDR) or ISAN.

Figure 2:
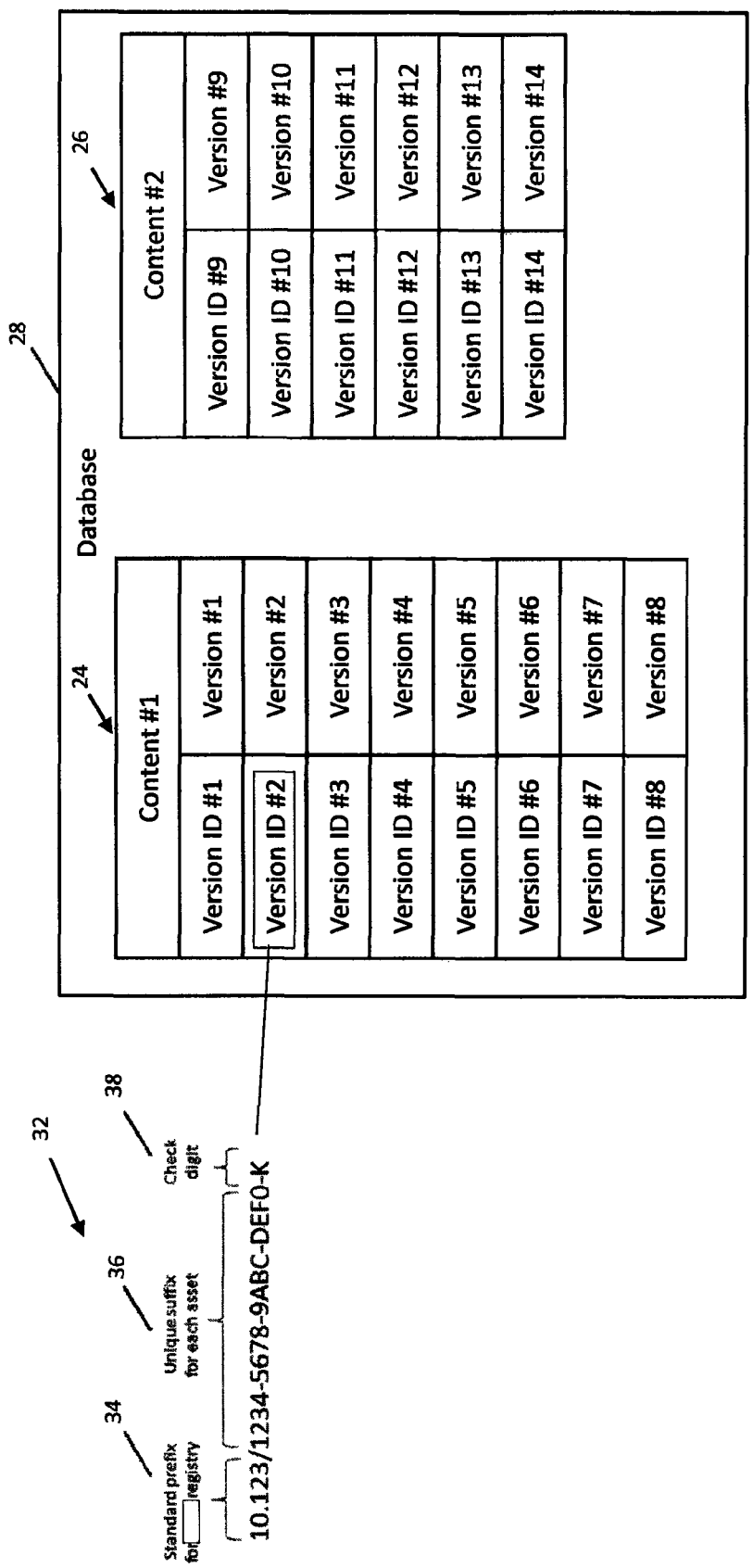
FIG. 2 illustrates an exemplary version ID in accordance with one non-limiting aspect of the present invention

The IDs associated with each version of available content may be referred to as version IDs. The resource server 18 may be configured to relate available versions with unique version IDs in order to facilitate the delivery thereof. FIG. 2 illustrates version charts 24, 26 generated by the resource server 18 in accordance with one non-limiting aspect of the present invention. The version charts 24, 26 may be stored within a relational or hierarchical database/computer-readable medium 28 of the resource server 18. Each piece of content available, or capable, for delivery from the content source 12 or other content sources associated with the terminal 18 may be associated with a content title, e.g., "Content #1" and "Content #2". At this level, Content #1 and Content #2 may represent the abstract idea of the content and may be referred to with a version/abstract ID. Each version of each piece of content available for transmission may be associated with a version reference, e.g., "Version #1", "Version #2", etc. The version references may be determined according to a universal identifier used to indicate characteristics of the corresponding version, i.e., whether the version is a 3-D or 2-D version, a HD or SD version, MPEG-2, MPEG-4, French, German, English, etc., and any/all combinations thereof.

Each of the version references may be assigned a version ID, e.g., "Version ID #1", "Version ID #2", etc. The version IDs may be generated according to any sufficiently unique identification methodologies. One example is use of a Digital Object Identifier (DOI)-based system. FIG. 2 illustrates an exemplary version ID 32 in accordance with one non-limiting aspect of the present invention. The version ID 32 may be comprised of a plurality of alphanumeric values, which may include standard prefix portion 34, a unique suffix portion 36, and a check digit portion 38. Each portion may be comprised of one or more alphanumeric values which may optionally be limited to 30 values in order to limit its size. The values may be self-identifying in that the values can be encoded and decoded according to pre-defined relationship, such as one defined by a corresponding version ID algorithm. The self-identifying values may be used to determine related information without having to embed that information within the version ID or data packets associated therewith. Instead, the values may assigned according to a specific set of rules associated with the version ID algorithm such that certain information may be decoded from certain one or more of the values. Alternatively, the version IDs may be completely opaque with no representational value or meaning.

The present invention contemplates an arrangement where the resource server 18 may be configured to track available (or capable) versions of the content according to the version ID associated therewith, and thereafter, to facilitate delivery of a selected version of the content. The version of the content selected for transmission may correspond with a corresponding version ID included with a content delivery request. The determination of the desired version may be facilitated once the terminal 16, or from some other requesting entity or user, is in possession of at least one version ID associated with the abstract content. The known version ID can then be used to determine other available versions of the content based on the relationship between the associated version IDs. Each of the version IDs may be unique values derived from a sufficiently large combination of values such that unique IDs may be used to relate a virtually limitless amount of content and version references and version IDs.

Figure 3:
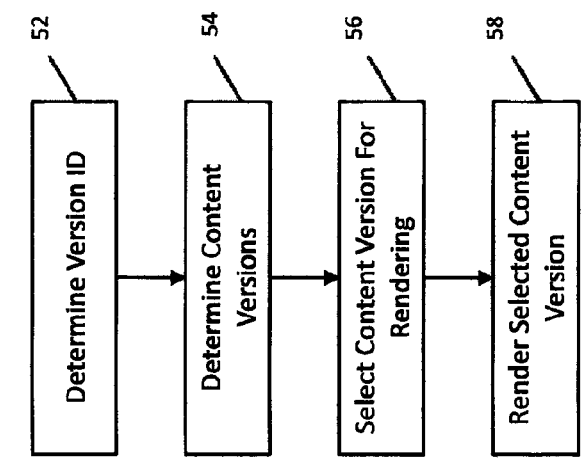
FIG. 3 illustrates a flowchart of method for delivering content to a terminal 16 for rendering in accordance with one non-limiting aspect of the present invention.

FIG. 3 illustrates a method 30 for delivering content to a terminal 16 for rendering in accordance with one non-limiting aspect of the present invention. The method is predominately described with respect to the content being a particularly identified one of a number of available television programs and the television programs being available according to a plurality of versions, e.g., versions having parameters specific to HD, SD, 2-D, 3-D, English, French, German, resolution, parental control, abstract, summary, preview, MPEG, non-MPEG, cellular, IP, operating system, etc. While the delivery of television programming is described, the present invention is not so limited and fully contemplates facilitating delivery of any type of electronic content with multiple versions. The ability of the present invention to facilitate assigning universal and unique version IDs to each available version of content for any type of content allows the invention to scale as necessary to support additional versions of the content. The version IDs may be continuously updated to support delivery of versions other than those specified herein or versions that are created after assignment of version IDs, i.e., for new versions created from content already assigned version IDs. Upon request from the terminal 16 or a user, new versions and version IDs can also be created in real time. For example, if an MPEG-4 version exists, but the MPEG-2 version does not exist, the MPEG-2 version can me created (by transcoding the MPEG-4 version), given a version ID, and sent to terminal 16.

Block 52 relates to determining a version ID of a version of a piece of content where either the version ID or the content has already been delivered to the terminal for rendering. This version ID may be a first version ID determined by the terminal 16 as one of a potential plurality of version IDs associated with the desired piece of content. The terminal 16, for example, may become aware of the first version ID or him and him and while being operated to watch a preview or abstract of the content, such as in response to browsing within a video-on-demand (VOD) portal of the content source 12, a webpage of streaming video provider, or some other interactive platform used to facilitate delivery of a preview/abstract to the terminal 16 for rendering, optionally as part of an advertisement campaign. The terminal 16 may also become aware of the first version ID, or the abstract content ID, while navigating through a user interface, an electronic programming guide (EPG), viewing a television channel, or through any number of other operations, such as by being provided with a playlist or a textual-based reference sufficient to otherwise identify the first version ID, i.e., without the terminal 16 first having to render the content associated with the first version ID.

Block 54 relates to determining available versions of the content. The available versions of the content may be determined based on a relationship associated with the first version ID. The terminal may determine the available content versions by decoding the first version ID or otherwise determining the first version ID relative to a pre-defined set of rules in order to facilitate self-identification of other versions of the content available for delivery solely from the one known version ID, or the abstract content ID or through direct communication with the resource server (18). The terminal may also determine available content versions by relating the first version ID to one of the version charts 24, 26, which may be previously stored on the terminal.

Optionally, in the event the terminal 18 is unable to self-identify the other available versions of the content or is not in possession of the version charts 24, 26 having a relation to the first version ID, the terminal 16 may issue a resource request to the resource server 18. The resource server 18 may then determine the available versions of the content for the terminal 16 and/or provide the terminal 16 with the appropriate version charts 24, 26. As the present invention contemplates a dynamic environment where versions of content are constantly being added and removed, i.e. registered and de-registered with the resource server 18, the resource server 18 may be in a better position to keep a more current listing of available content versions than the terminal 16 and/or it may be beneficial to limit communications and other processing of the terminal 16 required to keep continually an updated version charts.

The use of the resource server 18 to act as a gateway or authority for the available content versions may be particularly beneficial in an environment where the terminal 16 is capable of receiving the content from a large number of content sources 12. (While the single content source 12 is shown in FIG. 1, the present invention fully contemplates the terminal 16 being in communication with a limitless number of content sources 12.) The ability of the content source 12 to register the available version IDs with the resource server 18, and optionally instead of directly with the terminal 16, may provide a further benefit in that the content sources 12 may not need to communicate with each supported terminal 16 in order to appraise the terminals 16 of the available versions of the content. Since the terminals 16 may not desire a listing or to otherwise be appraised of all the available content versions, the content source 12 may eliminate the extensive messaging that would be required to deliver all this information to all of the terminals 16 in favor of simply providing the corresponding information to a single location, i.e., the resource server 18.

Block 56 relates to selecting one of the available versions of the content for rendering. The versions available for rendering, as noted above, may be determined based on a relationship to the first version ID, e.g., from a relation defined in a corresponding version charts 24, 26. The version charts 24, 26, shown in FIG. 2, may include a listing of version references that detail information regarding the available versions, i.e., whether the available versions are specific to HD, SD, 2-D, 3-D, English, French, German, resolution, parental control, abstract, summary, preview, MPEG-2, MPEG4, MPEG-DASH, fragmented file formats, cellular, IP, operating system, etc. The terminal 16 may process the version references, or data associated therewith, to generate a user interface that explains the available version in a manner sufficient to facilitate user selection. Optionally, the versions presented to the user may be limited to those compatible with the user's current terminal 16. The user may select the available version from a user interface.

Optionally, the selected version may be automatically determined by the terminal 16 and/or the resource server 18 based on preferences of the user, viewing habits, parental controls, device capabilities or limitations or other automated processes set by the user or other individual in control of the terminal 16. The automated selection process may be favored in situations in which the user has indicated a desire to render the entire content or made some other representation from which the desired version can be extrapolated. For example, the users viewing habits may be used to indicate a preference for viewing an HD version when available over and SD version of the content, English over French, or preference for parental control version during daytime hours. Similarly, the automated selection process may be favored in situations in which it may be desirable to prevent children or others from watching certain versions of the content without prior approval or authorization from a parent or other entity. The automated selection process may also be used to ameliorate the need of the user to identify versions operable with the operating capabilities of the terminal, i.e., alleviating the user from having to understand technical specifics of the terminal when selecting the version desired for viewing. The automated selection process may include the terminal and/or the resource server assessing various characteristics of the user in/your terminal, bandwidth requirements, network congestion, to determine a "best-fit" version for rendering.

Block 58 relates to rendering the selected version of the content at the terminal 16. This may include the terminal 16 issuing a delivery request to the content source 12 identified to be supporting delivery of the desired version. The appropriate content source 12 may be identified from a decoding of the version ID related with the desired version and/or specified within messaging from the resource server 18. In the event the desired version is available for multiple content sources 12, the resource server 18 may arbitrate between the available content sources based on subscription requirements, bandwidth allocation requirements, etc. Once contacted by the terminal 16, the appropriate content source 12 may establish a channel or other signaling medium to facilitate delivery of the desired version of the content to the terminal 16. Optionally, in the event the desired version is not stored or immediately available, the content source 12, or other entity designated to deliver the desired content, may transcode/generate a new version or re-format another version of the content into the desired version in order to facilitate immediate delivery, i.e., rather than waiting for the desired version to become available. The ability to transcode/generate new versions of the desired content may be beneficial in supporting "on-the-fly" transcoding and delivery of desired content. The content source 12 may identify the desired version from a version ID included within the delivery request, which may be a second version ID associated with a full-length rendering of the content or other available version.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for delivering content to a terminal, the content being available in a plurality of versions that are each independently identified with one of a plurality of version IDs, the plurality of versions each providing dissimilar versions of the content, the terminal being provided with a first version ID of the plurality of version IDs, the method comprising:

determining a delivery request from the terminal for the content, the request including a second version ID of the plurality of version IDs, the terminal determining the second version ID using a version ID algorithm that provides a pre-defined relationship between a plurality of alphanumeric characters included within each of the plurality of version IDs, the terminal processing the alphanumeric characters included within the previously provided first version ID using the version ID algorithm to determine the second version ID;

facilitating delivery of a second version of the plurality of versions of the content to the terminal, the second version corresponding with the one of the plurality of versions associated with the second version ID included within the delivery request;

the terminal being provided the version ID algorithm from a resource server in response to the terminal issuing a resource request to the resource server, the resource server limiting the versions identifiable with the version ID algorithm according to operating systems capabilities of the terminal identified from data included within the resource request.

2. The method of claim 1 further comprising relating together the plurality of versions and the plurality of version IDs within a relational database.

3. The method of claim 2 further comprising the terminal determining the second version ID by processing alphanumeric characters associated with the first version ID using the version ID algorithm, the version ID algorithm thereby enabling any one of the versions and version IDs to be determined from the first version ID.

4. The method of claim 3 further comprising the terminal generating a version chart to include the second version ID.

5. The method of claim 4 further comprising the terminal generating the version chart prior to issuing the delivery request.

6. The method of claim 4 further comprising the terminal facilitating display of a user interface representing the versions of the version chart and determining the second version ID as a function of related user inputs to the user interface.

7. The method of claim 6 further comprising the user interface being prevented from representing versions incompatible with operating characteristics of the terminal.

8. The method of claim 4 further comprising the terminal determining the second version ID based on collected user preferences.

9. The method of claim 4 further comprising the resource request including the first version ID.

10. The method of claim 9 further comprising the resource server identifying the version ID algorithm provided to the terminal based on the first version ID included in the resource request.

11. The method of claim 9 further comprising the terminal being provided the first version ID from a content source that delivers the second version of the content to the terminal.

12. The method of claim 11 further comprising the content source including the first version ID within signaling used to deliver a corresponding first version of the content to the terminal.

13. The method of claim 12 wherein the first version ID corresponds with a summary or abstract of the content.

14. The method of claim 11 further comprising the terminal issuing the resource request and obtaining the version ID algorithm through out-of-band signaling with the resource server.

15. A method of facilitating content delivery to a terminal comprising:

determining the content to be available in a plurality of versions that each provide dissimilar renderings;

associating each of the plurality of versions with at least one of a plurality of unique version IDs;

determining the terminal to be accessing a first version of the content, the first version being identified with a first version ID of the plurality of unique version IDs;

providing the terminal with a decoder sufficient to determine a plurality of additional version IDs for other available versions of the content, the additional version IDs being determined by decoding alphanumeric characters included as part of the first version ID, the additional version IDs being sufficient for use by the terminal to request delivery of the other available versions of the content; and the decoder determining the additional version IDs using a version ID algorithm, the version ID algorithm self-identifying the additional version IDs from the first version ID according to a pre-defined relationship there between.

16. The method of claim 15 further comprising in the event at least one of the of the additional versions is incompatible with operating requirements of the terminal, removing the version ID associated with each of the at least one incompatible versions from the plurality of additional version IDs provided to the terminal.

17. A system for delivering content to a terminal for rendering, the content being available according to a plurality of version, the system comprising:

a resource server operable to relate a unique version ID with each of the plurality of versions, each version ID being comprised of a sequence of alphanumeric values set according to an encoding algorithm, the encoding algorithm providing a pre-defined relationship between each unique version ID such that any one of the unique version IDs may be determined by decoding the values associated with another one of the unique version IDs, including information regarding terminal operating capabilities required for rendering the associated version;

a content source operable to output signaling sufficient for transporting the content to the terminal for rendering, the content source being further operable to determine the version of the content to be transported according to a version ID received from the terminal and without the content source having to notify the terminal of the available version and without the content source having to notify the terminal of the operation capabilities required for the terminal to render the transported version of the content; and wherein the resource server is operable to provide a relation of the plurality of versions and the associated version IDs for use by the terminal in determining the version ID to be transported to the content source.

* * * * *